US012106911B2

(12) United States Patent
Zheng et al.

(10) Patent No.: US 12,106,911 B2
(45) Date of Patent: Oct. 1, 2024

(54) IN-PLANE SLIDING PARALLEL CAPACITIVE RADIO FREQUENCY SWITCH

(71) Applicants: RESEARCH INSTITUTE OF TSINGHUA UNIVERSITY IN SHENZHEN, Guangdong (CN); TSINGHUA UNIVERSITY, Beijing (CN)

(72) Inventors: Quanshui Zheng, Beijing (CN); Xiaojian Xiang, Beijing (CN)

(73) Assignees: RESEARCH INSTITUTE OF TSINGHUA UNIVERSITY IN SHENZHEN, Guangdong (CN); TSINGHUA UNIVERSITY, Beijing (CN)

( * ) Notice: Subject to any disclaimer, the term of this patent is extended or adjusted under 35 U.S.C. 154(b) by 125 days.

(21) Appl. No.: 17/923,297

(22) PCT Filed: Jun. 28, 2020

(86) PCT No.: PCT/CN2020/098479
§ 371 (c)(1),
(2) Date: Nov. 4, 2022

(87) PCT Pub. No.: WO2022/000122
PCT Pub. Date: Jan. 6, 2022

(65) Prior Publication Data
US 2023/0238191 A1 Jul. 27, 2023

(51) Int. Cl.
*H01H 1/00* (2006.01)

(52) U.S. Cl.
CPC .................................. *H01H 1/0036* (2013.01)

(58) Field of Classification Search
CPC ........ H01H 15/00; H01H 15/06; H01H 15/10; H01H 15/16; H01H 2001/00;
(Continued)

(56) References Cited

U.S. PATENT DOCUMENTS

| | | | | |
|---|---|---|---|---|
| 5,121,089 | A | 6/1992 | Larson | |
| 9,978,402 | B2 * | 5/2018 | Zheng | G11B 5/581 |
| 10,486,195 | B2 * | 11/2019 | Sumant | B05D 5/08 |

FOREIGN PATENT DOCUMENTS

| | | | |
|---|---|---|---|
| CN | 1601902 | A | 3/2005 |
| CN | 109979768 | A | 7/2019 |

(Continued)

OTHER PUBLICATIONS

European Search Report issued by the European Patent Office in connection with International Application No. 20942503.2, dated Mar. 16, 2023.

(Continued)

*Primary Examiner* — Anthony R Jimenez
(74) *Attorney, Agent, or Firm* — Carter, DeLuca & Farrell LLP; George Likourezos

(57) ABSTRACT

An in-plane sliding parallel capacitive radio frequency (RF) switch includes a substrate, first to third drive components, an insulating layer, and a sliding component. Where a drive voltage is applied between the first and second drive components, the sliding component slides to the top of the first and second drive components; in this case, relatively large capacitance is formed between the first and second drive components and the sliding component, a RF signal is almost completely reflected, and the transmission is cut off. Where the drive voltage is applied between the second and third drive components, the sliding component slides to the top of the second and third drive components; in this case, no facing area between a first drive electrode and the sliding component exists in a vertical direction, the capacitance is rather small, and the RF signal may be transmitted basically without loss.

11 Claims, 2 Drawing Sheets

(58) Field of Classification Search
CPC ......... H01H 2001/02; H01H 2001/021; H01H 2001/023; H01H 2001/0237; H01H 2001/36; H01H 2203/028; H01H 2221/00; H01H 2225/004; H01H 2239/074; H01H 13/50; H01H 13/702; H01H 13/704; H01H 1/00; H01H 1/0036; H01H 1/0094; H01H 1/02; H01H 1/021; H01H 1/023; H01H 1/0237; H01H 1/12; H01H 1/18; H01H 1/36; C01B 32/186; C01B 32/188; G11B 5/255; G11B 5/31; G11B 5/58
USPC .......................................................... 200/237
See application file for complete search history.

(56) References Cited

FOREIGN PATENT DOCUMENTS

| | | | |
|---|---|---|---|
| CN | 110646060 | A | 1/2020 |
| EP | 3503284 | A1 | 6/2019 |
| IN | 110853985 | A | 2/2020 |

OTHER PUBLICATIONS

Xuanyu Huang, et al., "Superlubric Nanogenerators with Superb Performances", Tsinghua University, pp. 1-14.
Quanshui Zheng, "Super lubrication: A world of "zero" friction", pp. 1-16, 2016.
International Search Report issued by the China National Intellectual Property Administration in connection with International Application No. PCT/CN2020/098479, dated Mar. 31, 2021.

* cited by examiner

IN-PLANE SLIDING PARALLEL CAPACITIVE RADIO FREQUENCY SWITCH

CROSS REFERENCE TO RELATED APPLICATION

This is a national stage application filed under 35 U.S.C. 371 based on International Patent Application No. PCT/CN2020/098479, filed on Jun. 28, 2020, and disclosure of which is incorporated herein by reference in its entirety.

TECHNICAL FIELD

The present disclosure belongs to the technical field of a radio frequency micro-electromechanical system switch (RF MEMS Switch) and, in particular, to an in-plane sliding parallel capacitive RF switch based on a floating potential.

BACKGROUND

With the development of radar and wireless communication technology and the development of miniaturization and integration of the RF devices, the RF devices with small size, low power, high performance, and multiple functions have become the development trend in the radio field and MEMS switches emerge as the times require. RF MEMS switches have gradually replaced traditional GaAs field effect transistor (FET) switches and become the development direction of RF switches. Compared with the traditional switches, the RF MEMS switches have the advantages of lower insertion loss, higher isolation, better linearity, lower power consumption, smaller size and the like, can be easily integrated with IC circuits, and have a broad application foreground. At present, the existing RF MEMS switches mainly include an electrostatic drive mechanism, a thermal drive mechanism, an electromagnetic drive mechanism, a piezoelectric drive mechanism and other drive manners.

Compared with the traditional P-I-N diode switch and FET transistor switch, the RF MEMS electrostatic switch, which is a basic electronic component, has the characteristics of lower power consumption, lower insertion loss, lower crosstalk, higher isolation, and higher linearity and is considered to be one of the most important MEMS devices. In particular, with the rapid development of 5G communication systems, radar systems, satellite communication systems, and high-performance RF chip systems in recent years, the industry has higher requirements for the characteristic of the underlying RF switch such as the power consumption, reliability, isolation, linearity, and power handling capability. For example, a long term evolution-advanced (LTE-A) antenna switch with a carrier aggregation function in the 5G system must satisfy the requirement that $IIP_3=90$ dBm, while the RF MEMS switch is the only switch that can satisfy that $IIP_3>90$ dBm. Since traditional solid-state semiconductor switches (the P-I-N switch and the FET switch) realize the conduction through the doped carriers and exist the contact barriers, the switches present relatively poor quality factor (Ron×Coff) and have a leakage current in an off state which causes a higher insertion loss, lower isolation, and lower linearity of the switches, thereby making this type of switches unsuitable for switching high-frequency RF signals. The RF MEMS electrostatic switch conducts RF signals through the mechanical contact and has physical isolation between signal lines so that the RF MEMS electrostatic switch has low power consumption (nj), low insertion loss, and high isolation and high linearity, thereby greatly reducing power consumption and costs of wireless communication systems, radar detection systems and satellite systems, improving the transmission fidelity of RF signals, and significantly improving the overall performance of the systems. The development and application of the RF MEMS electrostatic switch have become key technologies for advanced electronic equipment such as wireless communication (5G) systems, radar systems, and satellite systems.

Compared with widely applied semiconductor RF switches, although the RF MEMS electrostatic switch has many advantages, an on-off manner of mechanical contact brings serious problems in reliability. The contacts or insulating layer of the RF MEMS electrostatic switch may be easily damaged in high-speed collisions, resulting in an increase in on-resistance, thereby causing a relatively strong thermal effect and a device failure. At the same time, damage to the insulating layer also exacerbates the accumulation of surface charges. When the charge accumulation exceeds a critical value, self-electrostatic stiction failure of the switch occurs; the arc discharge that occurs at the moment of contact opening may cause the contact material to melt, causing a significant increase in contact resistance or even direct adhesion between the contact and the conductive line; when high-energy power passes through the switch, an enough electrostatic force is coupled between the upper and lower contacts or electrode plates so that self-lock and pull-in of the switch occur. Generally, the processing power of the RF MEMS electrostatic switch is below 1 W, while the processing power of the semiconductor switch may reach 1 to 10 W. The above is one of the main reasons affecting the reliability and application field of the RF MEMS. Compared with traditional semiconductor switches, the service life of the RF MEMS electrostatic switch is more than two orders of magnitude shorter. In addition, the current standard voltage used in integrated circuit (IC) systems is lower than 5 V, while the drive voltage of the RF MEMS electrostatic switch is generally between 10 V to 80 V, which is why RF MEMS electrostatic switches are rarely applied in mobile phone wireless communication systems. To sum up, improving the power handling capability, reducing the drive voltage, and improving the reliability are key issues to be solved urgently for the further development of the RF MEMS electrostatic switches.

Superlubricity technology studies the friction-free and wear-free sliding phenomenon between two or the same materials. The initial study is limited to nano-scale superlubricity phenomena, such as the superlubricity between multi-arm coaxial carbon nanotubes and the superlubricity between nanoprobes and two-dimensional materials. In 2013, Professor Quanshui Zheng discovered a superlubricity phenomenon between highly oriented pyrolytic graphite (HOPG) sheet materials at a micron scale for the first time, which marked the transition of the superlubricity from the basic research to the applicable technical research. According to a principle of the superlubric structure, the present disclosure proposes an in-plane sliding parallel capacitive RF switch, so as to reduce the drive voltage and greatly improve the service life and power handling capability of the switch.

SUMMARY

For shortcomings in the existing art, an object of the present disclosure is to provide an in-plane sliding parallel capacitive RF switch based on a superlubric structure according to the low-friction and wear-free in-plane sliding motion between a superlubric structure and a flat heterogeneous substrate.

To achieve the object of the present disclosure, technical solutions adopted by the present disclosure are an in-plane sliding parallel capacitive RF switch based on a superlubricity structure. The RF switch includes a substrate, a drive component, an insulating layer and a sliding component. Where a drive voltage is applied between two drive components, the sliding component slides to the top of the drive component under the action of a horizontal force; in this case, relatively large capacitance is formed between the drive component and the sliding component, a RF signal is almost completely reflected, and the transmission is cut off. Where the drive voltage is applied between the other drive component, the sliding component slides to the top of the other drive component under the action of a horizontal force; in this case, no facing area between the previous drive component and the sliding component exists in the vertical direction, the capacitance is rather small, and the RF signal may be transmitted basically without loss.

Specifically, the in-plane sliding parallel capacitive RF switch provided in the present disclosure is achieved by solutions described below.

An in-plane sliding parallel capacitive RF switch based on a superlubricity structure includes a substrate, a drive component, an insulating layer, and a sliding component. The drive component is disposed in the substrate and includes a first drive component, a second drive component, and a third drive component; the insulating layer is disposed on a surface of the substrate; the sliding component has a superlubric interface, is disposed on the insulating layer, and contacts with the insulating layer through the superlubric interface; and the drive component is able to drive the sliding component to change a position of the sliding component relative to the drive component.

Further, the sliding component is capable of being driven to slide along a horizontal direction in a plane, and overlapping and separation of the drive component and the sliding component in a vertical plane is adjusted to achieve switching.

Further, the drive component includes three drive electrodes.

Further, the sliding component is a superlubric slice which is preferably selected from graphite and preferably from a highly oriented pyrolytic graphite (HOPG).

Further, the substrate is an insulating material or a semiconductor material.

Further, the semiconductor material is preferably high-resistance silicon; and the insulating material is preferably selected from $SiO_2$, SiC, sapphire, and mica.

Further, the insulating layer is preferably a silicon oxide layer.

Further, a thickness of the insulating layer is nanoscale

Further, a thickness of the insulating layer is 2 to 50 nanometers.

Further, the sliding component is driven by the drive component to slide along the horizontal direction in the plane through electrostatic drive.

In the present disclosure, a sandwich structure consisting of the drive component, the insulating layer and the sliding component achieves wear-free sliding of the sliding component on the surface of the flat insulating layer with extremely low friction. In a disconnected state, the capacitance between the sliding component and the drive component is extremely small so that almost no loss of the RF signal exists; in a closed state, the sliding component and the drive component form relatively large capacitance due to the nanoscale insulating layer, and the RF signal is completely reflected. Voltage control timing is set so as to control the on-off of the RF switch.

In the present disclosure, a relatively low drive voltage, an extremely long service life and a high power handling capability may be achieved due to extremely low friction and no wear, and a major obstacle that restricts the service life of RF MEMS electrostatic switches is expected to be broken through, thereby promoting the practical process of the RF MEMS electrostatic switches and promoting the leap-forward development of research on related electronic equipment such as wireless communication systems (5G), high-performance phased array radars, and satellite communication systems.

REFERENCE LIST

1 HOPG SUPERLUBRIC SLICE
2 insulating layer
3 substrate
4 first drive electrode
5 second drive electrode
6 third drive electrode

DETAILED DESCRIPTION

The superlubric slice in the present disclosure is part of a superlubric slider in the existing art. During relative sliding between two contact surfaces of the existing superlubric sliders, the friction is almost zero, a friction coefficient is less than one thousandth, and wear is zero.

For example, an existing preparation method of the superlubric slice based on the HOPG is specifically described below.

In step 1, the HOPG is covered with the photoresist. For example, the HOPG is covered by the photoresist through spin-coating.

In step 2, the photoresist is patterned and multiple photoresist mesas are retained in the patterned photoresist. The step of patterning the photoresist determines the layout of the graphite mesas formed in the subsequent steps. For example, the photoresist may be patterned by an electron beam etching method, an average size of the formed photoresist mesas may be, for example, 1 μm to 30 μm, and an average interval between the photoresist mesas is 1 μm to 100 μm so that the etched graphite mesas also have corresponding average diameters and average intervals.

In step 3, a substrate is etched and part of the substrate that is not protected by the photoresist is removed, so as to form multiple graphite mesas. The etching method may be, for example, reactive ion etching (RIE).

In step 4, the multiple graphite mesas are cleaved one by one by a mechanical arm to check whether the graphite sliders have superlubric slices. On a lower surface of the graphite mesa with self-healing properties, an HOPG slice with the superlubric shear surface is the superlubric slice.

Embodiments of the present disclosure are further described below with reference to the drawings.

Figure 1:
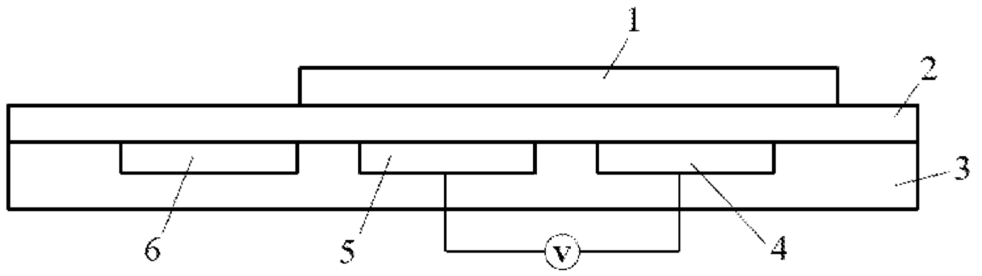
FIG. 1 is a schematic diagram of a conducting state of a parallel capacitive RF switch according to the present disclosure.

As shown in FIG. 1, the in-plane sliding parallel capacitive RF switch is composed of a high-resistance silicon substrate 3, a first drive electrode 4, a second drive electrode 5, a third drive electrode 6, an insulating layer 2, and an HOPG superlubric slice 1. The first drive electrode 4, the second drive electrode 5, and the third drive electrode 6 are embedded in the substrate 3. A surface of the substrate 3 and surfaces of the first drive electrode 4, the second drive electrode 5, and the third drive electrode 6 are flush and remain atomically flat. The insulating layer 2 covers the first drive electrode 4, the second drive electrode 5, and the third drive electrode 6 and is used for insulating between the HOPG superlubric slice and the first drive electrode 4, the second drive electrode 5 and the third drive electrode 6. A thickness of the insulating layer 2 is controlled between 2 nm to 50 nm so that a gap between the first drive electrode 4, the second drive electrode 5 and the third drive electrode 6 and the superlubric slice 1 is small enough, thereby ensuring a relatively small excitation voltage. Alternatively, the thickness of the insulating layer 2 may be controlled between 2 nm to 200 nm. The HOPG superlubric slice 1 is disposed on the insulating layer so as to form a superlubric slider with the insulating layer 2. An initial position of the superlubric slice 1 faces the first drive electrode 4. Since the HOPG superlubric slice 1 has a flat superlubric surface in the atomic scale, the HOPG superlubric slice 1 may slide on the surface of the insulating layer 2 with extremely low friction and without wear; and at the same time, adhesion failure due to charge accumulation on the electrode does not occur, thereby achieving an ultra-long service life.

Figure 2:
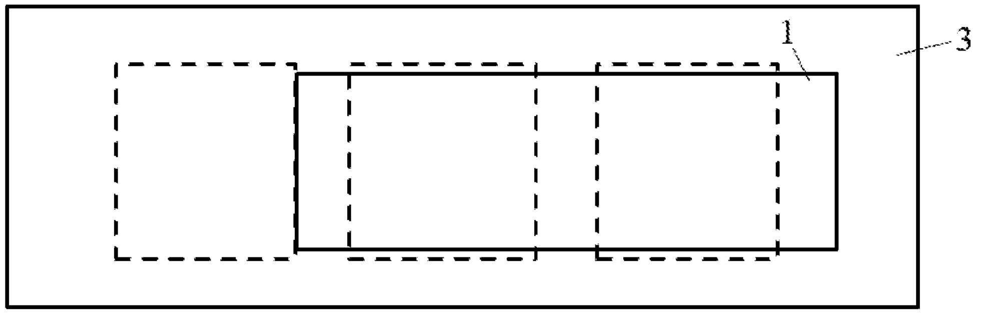
FIG. 2 is a top diagram of a conducting state of a parallel capacitive RF switch according to the present disclosure.

A working process of the in-plane sliding parallel capacitive RF switch is described below. FIGS. 1 and 2 show that the RF switch is in a conducting state. A drive voltage V is applied between the first drive electrode 4 and the second drive electrode 5. In this case, left and right ends of the HOPG superlubric slice 1 induce charges to generate a floating potential, and the HOPG superlubric slice 1 moves toward a position where the potential energy is the smallest, that is, a centrosymmetric position of the first drive electrode 4 and the second drive electrode 5. In this case, between the HOPG superlubric slice 1 and the third drive electrode 6, since no overlapping area in a vertical direction exists, the capacitance is close to zero, and RF signals can all pass through without reflection loss.

Figure 3:
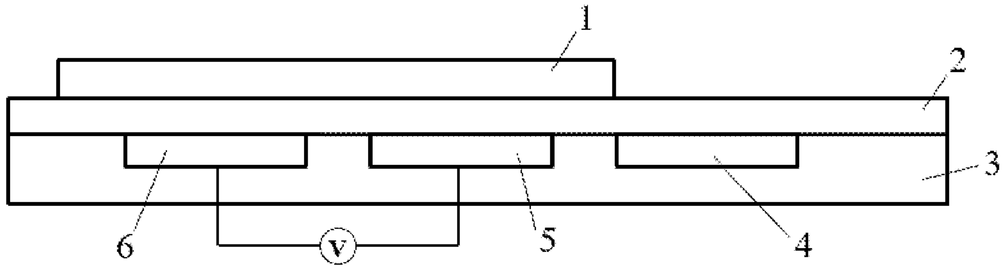
FIG. 3 is a schematic diagram of a non-conducting state of a parallel capacitive RF switch according to the present disclosure.
Figure 4:
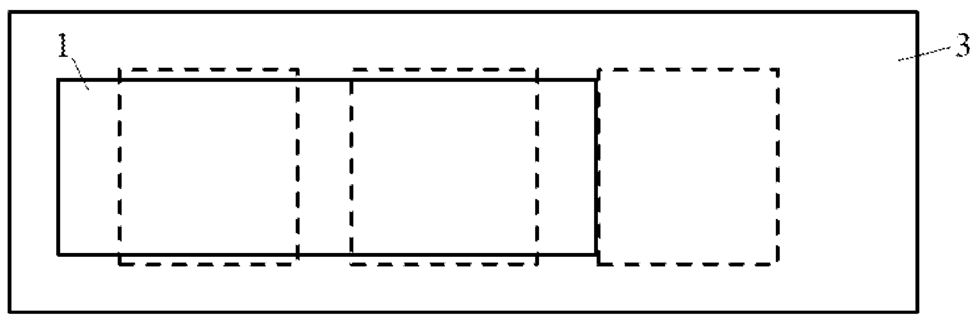
FIG. 4 is a top diagram of a non-conducting state of a parallel capacitive RF switch according to the present disclosure.
Figure 5:
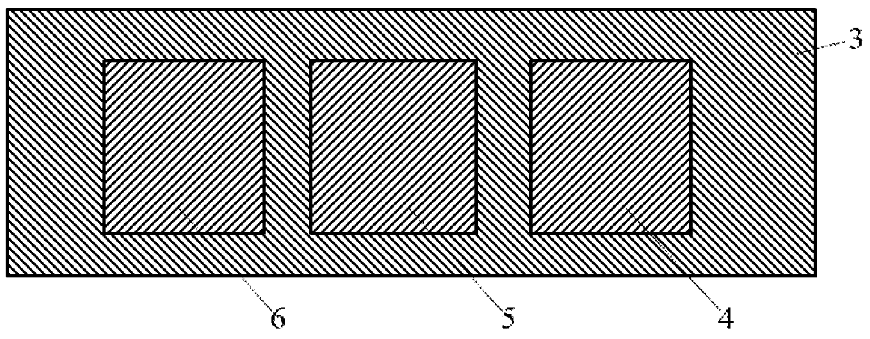
FIG. 5 is a sectional diagram of a substrate of an embedded drive electrode of a parallel capacitive RF switch according to the present disclosure.

In the case where the drive voltage V is applied between the second drive electrode 5 and the third drive electrode 6 as shown in FIGS. 3 and 4, the HOPG superlubric slice 1 is subjected to a leftward force and pulled to a centrosymmetric position of the second drive electrode 5 and the third drive electrode 6. Since the thickness of the insulating layer 2 is nanoscale, a relatively large capacitance is formed between the HOPG superlubric slice 1 and the third drive electrode 6, the RF signals are completely reflected, and the transmission is cut off.

The number, arrangement, and timing control of the drive electrodes and the size of the HOPG superlubric slice are adjusted so as to achieve the in-plane continuous sliding of the HOPG superlubric slice.

INDUSTRIAL APPLICABILITY

The above are only preferred embodiments of the present disclosure. Any equivalent variations or modification made according to the scope of the claims in the present disclosure should belong to the coverage scope of the claims in the present disclosure.

What is claimed is:

1. An in-plane sliding parallel capacitive radio frequency (RF) switch, comprising:

a substrate;

a drive component which is disposed in the substrate and comprises a first drive component, a second drive component, and a third drive component;

an insulating layer which is disposed on a surface of the substrate; and a sliding component which has a superlubric interface, is disposed on the insulating layer, and contacts with the insulating layer through the superlubric interface; wherein the drive component is able to drive the sliding component to change a position of the sliding component relative to the drive component.

2. The RF switch of claim 1, wherein the sliding component is configured to slide along a horizontal direction in a plane in response to the sliding component being driven, and overlapping and separation of the drive component and the sliding component in a vertical plane is adjusted to achieve switching.

3. The RF switch of claim 1, wherein the drive component is a drive electrode.

4. The RF switch of claim 1, wherein the insulating layer is a silicon oxide layer.

5. The RF switch of claim 1, wherein the sliding component is electrostatically driven.

6. The RF switch of claim 1, wherein the sliding component is a superlubric slice with a superlubric surface.

7. The RF switch of claim 6, wherein the sliding component is a highly oriented pyrolytic graphite (HOPG) superlubric slice.

8. The RF switch of claim 1, wherein the substrate is an insulating material or a semiconductor material.

9. The RF switch of claim 8, wherein the semiconductor material is high-resistance silicon; and the insulating material is SiO2, SiC, sapphire, or mica.

10. The RF switch of claim 1, wherein the insulating layer has an atomically smooth surface and has a thickness of 1 to 100 nanometers.

11. The RF switch of claim 10, wherein the insulating layer has a thickness of 2 to 50 nanometers.

* * * * *